United States Patent [19]
Fabro et al.

[11] Patent Number: 5,144,829
[45] Date of Patent: Sep. 8, 1992

[54] SHEARS UNIT

[75] Inventors: Giorgio D. Fabro, Cassacco-Fraz.Montegnacco; Marcello D. Fabro, Udine, both of Italy

[73] Assignee: M. E. P. Macchine Elettroniche Piegatrici SpA, Reana Del Rojale, Italy

[21] Appl. No.: 487,297

[22] Filed: Mar. 2, 1990

[30] Foreign Application Priority Data

Mar. 6, 1989 [IT]  Italy ............................ 83349 A/89

[51] Int. Cl.⁵ ............................................ B21D 7/024
[52] U.S. Cl. ........................................ 72/294; 72/307; 72/203; 72/217
[58] Field of Search .................. 72/294, 307, 216–219, 72/321, 203, 149, 131, 387, 388; 140/140, 139

[56] References Cited

U.S. PATENT DOCUMENTS

| | | | |
|---|---|---|---|
| 594,128 | 11/1897 | Warner | 140/140 |
| 3,991,600 | 11/1976 | Del Fabro | 72/217 |
| 4,049,026 | 9/1977 | Del Fabro | 72/388 |
| 4,248,273 | 2/1981 | Marcello | 72/217 |
| 4,866,970 | 9/1989 | Castiglioni | 10/12 T |

FOREIGN PATENT DOCUMENTS

| | | | |
|---|---|---|---|
| 258109 | 3/1988 | European Pat. Off. | 72/307 |
| 255722 | 11/1986 | Japan | 72/149 |
| 1324711 | 7/1987 | U.S.S.R. | 72/294 |

Primary Examiner—Daniel C. Crane
Attorney, Agent, or Firm—Antonelli, Terry, Stout & Kraus

[57] ABSTRACT

Shears unit positioned immediately upstream of a bending assembly (13) comprising a bending disk (19) and support means (15) to change the reciprocal positions of a contrast roll (20) and a section or sections (11) in a bending-shaping machine, the shears unit including a stationary blade support (33) positioned astride and above a part of the bending disk (19), the blade support (33) bearing and positioning a laterally shearing stationary blade (34), which cooperates with a laterally displaceable blade holder (30).

8 Claims, 3 Drawing Sheets

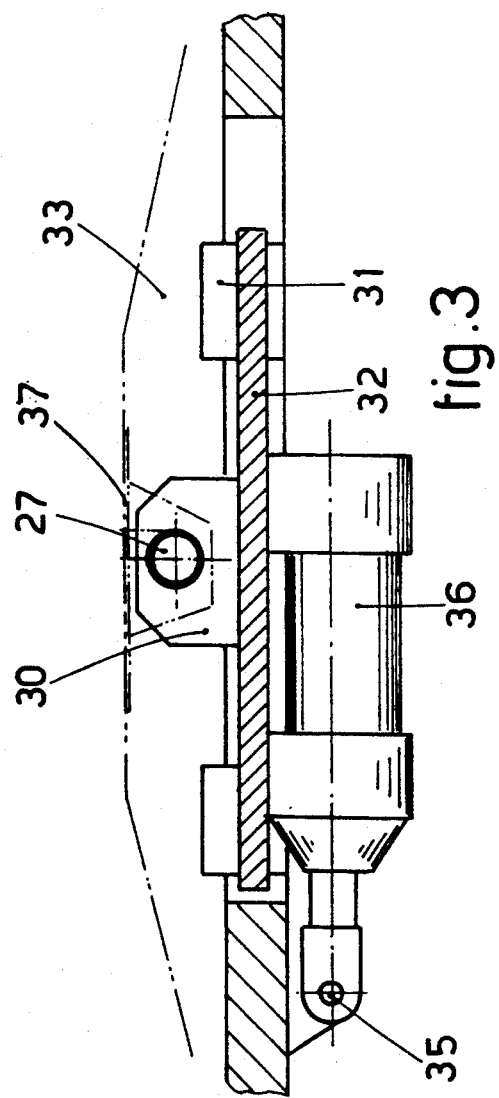
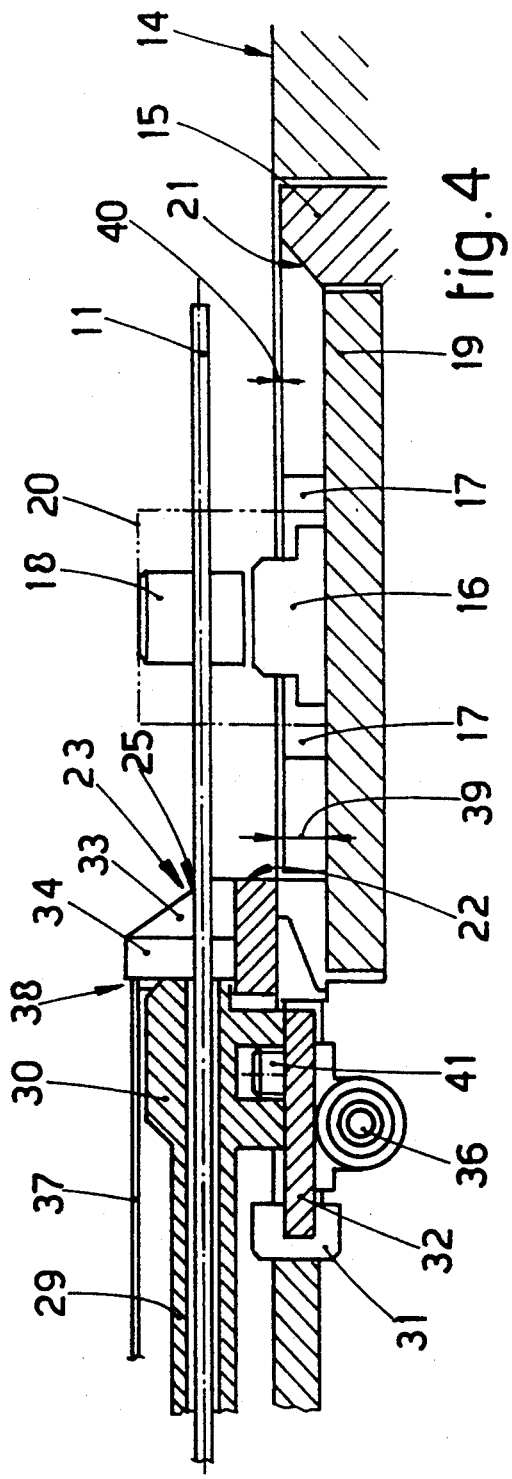

SHEARS UNIT

This invention concerns a shears unit that cooperates with a bending assembly for sections in bending-shaping machines.

The invention is applied correctly to machines that bend sections and is employed advantageously, but not only, in machines that bend and shape bars for building work.

The invention is also employed in all those cases where sections are to be bent by a bending pin (or its equivalent) which can rotate clockwise and anticlockwise about an axis by a required angular value, which amounts to a maximum of 270° and is positioned astride the axis of feed of the section.

By sections are meant here solid or hollow sections, including those produced by rolling, drawing, extrusion or forming.

The invention concerns a shears unit located immediately upstream of a bending assembly that serves to bend sections according to a required geometric configuration, which may include bends with a clockwise and anticlockwise development.

Bending-shaping machines entail the problem of the bending of the section during bending-shaping operations between two stationary contact points consisting of the contrast roll and the blade of the shears. The farther these two stationary contact points are apart, the more evident is the bending.

Where the sections have a small diameter, this bending reaches a considerable value, which lessens the accuracy of bending of the bending assembly.

To obviate this drawback and to be able to bring the shears close to the contrast roll, shears are employed which shear in a direction at a right angle to the work platform.

However, this type of shearing is dangerous because it throws the shaped product thus obtained, even along a considerable distance, in front of the bending-shaping machine.

Very long contrast rolls and bending pins have also been provided so that the bending assembly can be positioned well below the work platform, but if this is done, an operating restriction is caused by the bending induced in the contrast roll, so that too small shaped diameter cannot be produced.

Moreover, the opening which is present in the work platform and within which the bending assembly is located, becomes the cause of obstruction, jamming and interference with the section being shaped, etc., which slow down the output.

Bending assemblies have also been employed which use, instead of a bending disk, a bending arm that bears the bending pin at its end, but this embodiment leaves momentarily vacant spaces which interfere with the section and create jamming, blockages, etc. that slow down and hold up the work.

The present applicant has found that the best conditions for using a bending assembly in bending-shaping machines are achieved with a bending assembly that includes a disk holding a bending pin.

He has also found that this bending-shaping assembly should be of a type capable of clockwise and anticlockwise rotation, with which it is possible to exchange the reciprocal positions of the contrast roll and the section or sections.

To obviate the above shortcomings and obtain a shears located as close as possible to the contrast roll, with this closeness conditioned only by an angle of rotation of the bending pin up to 270° (135°+135°) on a disk-type bending assembly and with the ability to exchange the reciprocal positions of the contrast roll and the section, the present applicant has designed, tested and embodied this invention.

The shears unit upstream of a disk-type bending assembly providing the exchange of the reciprocal positions of the contrast roll and the section in a bending-shaping machine is described and characterized in the main claim, while the dependent claims disclose variants of the idea of the solution.

According to the invention the shears operates by shearing laterally and the support of the stationary blade is located astride and above part of the bending disk.

This blade support comprises continuous frontal and lateral bevels suitable to enable the section to slide while being shaped. The upper surface of the bending disk is slightly enclosed in the work platform and is located at a minimum distance from the base of the stationary blade support.

A bevel for the sliding of the section is provided between the work platform and the surface of the bending disk.

A slide block for lateral exchange of the reciprocal positions of the contrast roll and the section, where a slide block is provided for this exchange, slides alongside the front edge of the stationary blade support.

The attached figures, which are given as a non-restrictive example, show the following:

FIG. 1 gives a perspective from above of an embodiment of the invention;

FIG. 3 shows a vertical lengthwise section of the slide block that bears the shears of FIG. 1;

FIG. 4 shows a vertical lengthwise section of the axis of the section or sections to be shaped.

The description deals with the case of the bending-shaping of one section 11, but a plurality of sections 11 can also be processed at one and the same time in a known manner.

Figure 1:
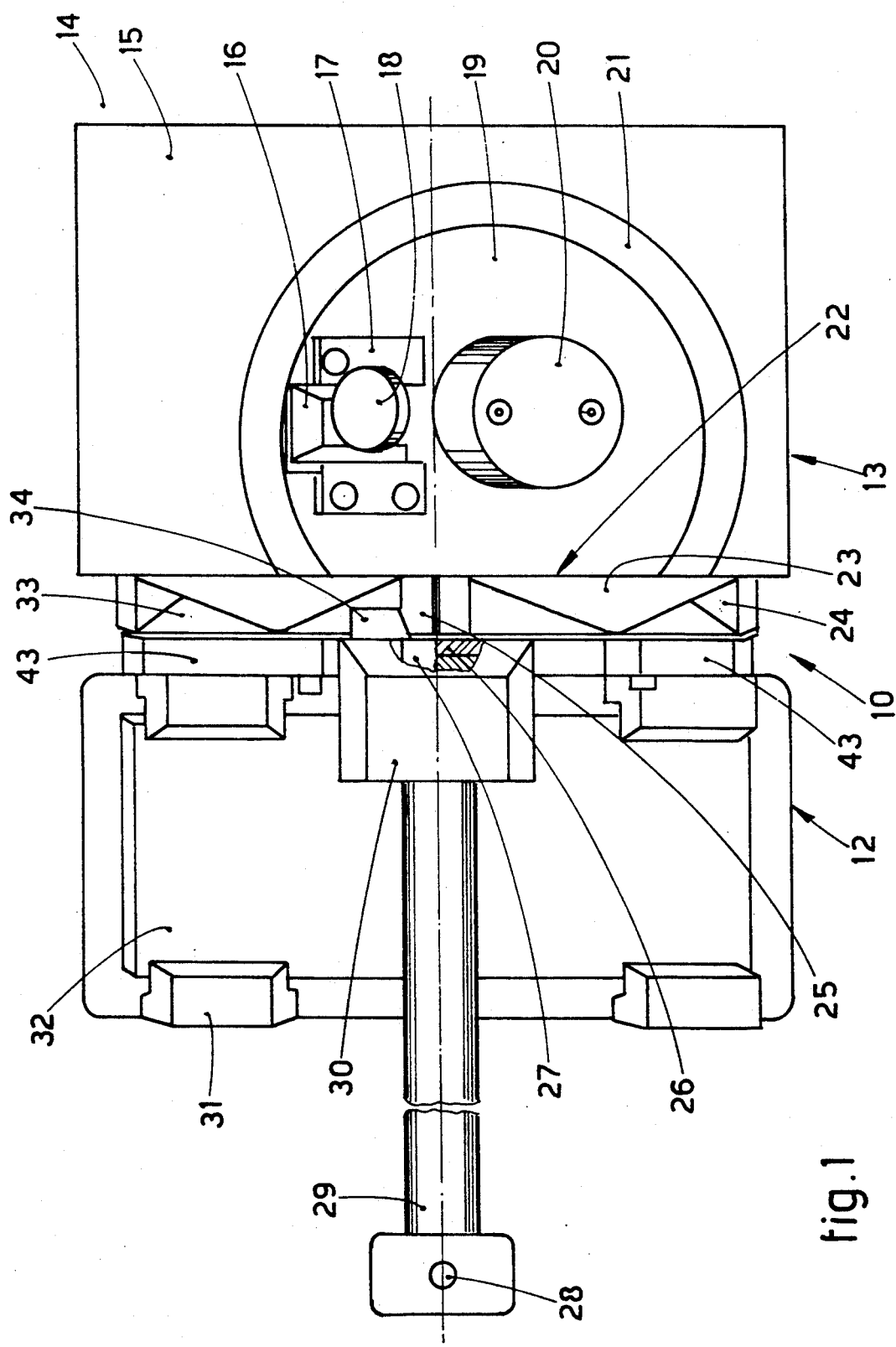
Figure 2:
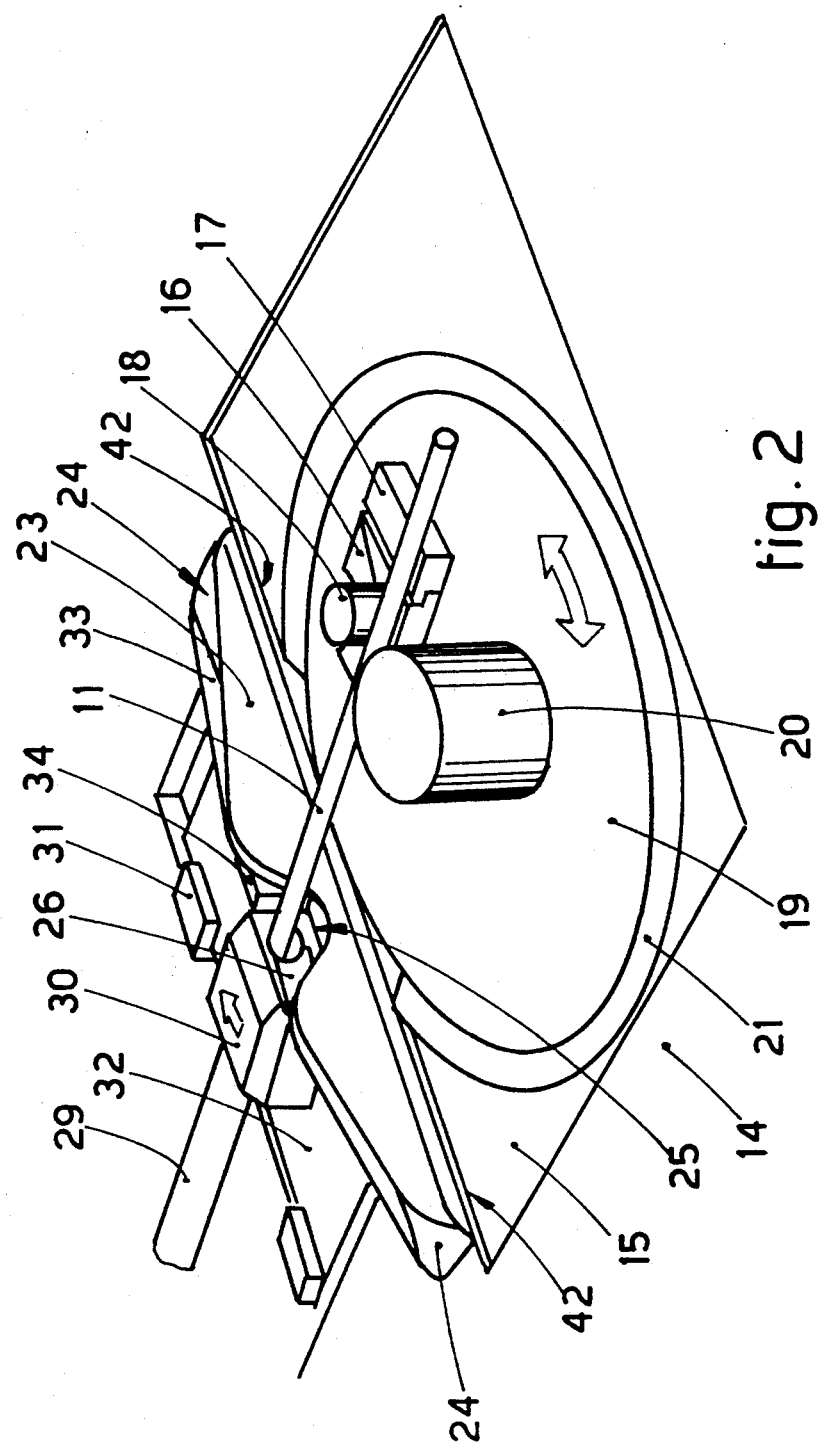
FIG. 2 shows a three-dimensional view of the embodiment of FIG. 1.

FIG. 1 shows a bending assembly 13 downstream of a shears unit 12, the combination of the two 12-13 constituting a shears-bending assembly 10.

The shears unit 12 comprises a support 33 for a stationary blade 34 with a central through passage 25, where a stationary blade 34 is located and secured.

The blade support 33 comprises frontally a frontal bevel 23 and, laterally, lateral bevels 24.

The blade support 33 includes at its rear an anchorage and continuous protection seating 37, which becomes positioned in a lowered position 38 in relation to the upper edge of the blade support 33.

The blade support 33 comprises lateral supports 42 and is clamped on rear stationary supports 43, which are secured to a work platform 14.

When included in a slidable version, a movable support 15 located slightly (40) lower than the work platform 14 on which the blade support 33 is rested at 42 cooperates with the front edge 22 of the blade support 33.

A bending disk 19 is placed lower by a determined value 39 than the work platform 14; this determined value 39 is established by the height of a support 16 of a bending pin 18 and by the position of contact at the point of maximum rotation (about 135° clockwise and anticlockwise).

The pin support 16 is located and fixed on the bending disk 19 by means of adjustment blocks 17.

As we said above, the determined value 39 is established by the height of contact of the pin support 16 when the latter is in the position most distant from the axis of rotation of the bending disk 19 and when the bending pin 18 is at about 135° clockwise or anticlockwise in relation to the axis of the section 11.

A circumferential bevel 21 for the sliding of the section 11 is included between the upper surface of the bending disk 19 and the upper surface of the movable support 15.

The bending disk 19 lies partly below the blade support 33 and therefore rotates and can move laterally therebelow to exchange the reciprocal positions of the contrast roll 20 and the section 11.

The blade support 33 comprises the lateral supports 42 spaced apart by the value of the overall bulk of the bending disk 19 in the two lateral extreme positions of exchange.

A blade holder 30 is included with the upper part of the blade support 33 and in correlation with the stationary blade 34 and is firmly secured to a guide pipe 29 and can oscillate on a rear oscillation pivot 28.

The blade holder 30 may hold frontally a movable blade 26, which cooperates with a passage 27 through which the section 11 passes.

The blade holder 30 is supported and positioned on the slide block 32 by means of a transmission pin 41.

The slide block 32 can slide in guides 31 and is actuated by a cylinder/piston actuator 36, which is anchored to the slide block 32 and thrust against a fixed point 35.

Shearing is carried out by lateral displacement of the blade holder 30 towards the stationary blade 34.

We claim:

1. A shears-bending assembly comprising:
    a bending assembly comprising a rotatable bending disk having a contrast roll and a bending pin provided in an upper surface thereof, said bending disk being supported on support means for changing the reciprocal positions of said contrast roll and a section or sections to be bent; and
    a shears unit provided upstream of said contrast roll with respect to a direction of feed of said section or sections to be bent, said shears unit comprising a stationary blade support bearing and positioning a laterally shearing stationary blade and being positioned astride and above a part of said bending disk, a laterally displaceable blade holder, and means for laterally displacing said laterally displaceable blade holder toward said laterally shearing stationary blade for shearing said section or sections.

2. A shears-bending assembly as claimed in claim 1, wherein said bending pin is provided on said bending disk at a position offset from an axis of rotation of said ending disk and can rotate so as to be positioned at an angle of up to about 135° clockwise or anticlockwise with respect to an axis of feed of said section or sections to be bent.

3. A shears-bending assembly as claimed in claim 1, in which the stationary blade support comprises bevels and lateral bevels and lowered means for support and continuous rear protection.

4. A shears-bending assembly as claimed in claim 1, in which the stationary blade support cooperate lateral supports with a work platform, the lateral supports being spaced apart by the value of the overall lateral bulk of the bending disk in the two lateral extreme positions of exchange of the contrast roll with the section.

5. A shears-bending assembly as claimed in claim 1, in which the upper surface of the bending disk is positioned lower than a work platform a value determined by the height of contact between a bending pin support and the stationary blade support when the bending pin support is in the farthest position allowed by the axis of rotation of the bending disk and when the bending pin is positioned at about 135° clockwise or anticlockwise to the axis of the section.

6. A shears-bending assembly as claimed in claim 1, in which a connecting bevel portion included between the upper surface of the bending disk and the upper surface of a surrounding movable support.

7. A shears-bending assembly as claimed in claim 1, in which said laterally displaceable blade holder is solidly fixed to a guide pipe pivoted at a distance on an oscillation pivot and is positioned laterally by a slide block.

8. A shears-bending assembly as claimed in claim 1 in which a movable support bearing the bending assembly for the exchange of the reciprocal positions of the contrast roll and the section terminates at the front edge of the stationary blade support.

* * * * *